US007826954B2

(12) United States Patent
Muramatsu et al.

(10) Patent No.: US 7,826,954 B2
(45) Date of Patent: Nov. 2, 2010

(54) SYSTEM FOR MONITORING SENSOR OUTPUTS OF A GAS TURBINE ENGINE

(75) Inventors: Hironori Muramatsu, Wako (JP); Yukinobu Sugitani, Wako (JP)

(73) Assignee: Honda Motor Co., Ltd., Minato-Ku, Tokyo (JP)

(*) Notice: Subject to any disclaimer, the term of this patent is extended or adjusted under 35 U.S.C. 154(b) by 2 days.

(21) Appl. No.: 11/165,497

(22) Filed: Jun. 24, 2005

(65) Prior Publication Data

US 2007/0005219 A1 Jan. 4, 2007

(30) Foreign Application Priority Data

Jun. 25, 2004 (JP) ............................. 2004-187874
Jul. 28, 2004 (JP) ............................. 2004-219574

(51) Int. Cl.
*G06F 19/00* (2006.01)
*G06G 7/70* (2006.01)

(52) U.S. Cl. ........................... 701/100; 701/34; 701/99; 701/112; 701/113; 702/85; 702/104; 702/193; 477/30

(58) Field of Classification Search .................. 701/34, 701/93, 99, 100, 112, 113; 702/139, 85, 702/104, 193; 477/30
See application file for complete search history.

(56) References Cited

U.S. PATENT DOCUMENTS

| 3,721,120 | A | * | 3/1973 | Howell et al. .............. 73/112.03 |
| 3,736,796 | A | * | 6/1973 | Hohenberg ................ 73/178 T |
| 3,834,361 | A | * | 9/1974 | Keely ......................... 123/479 |
| 3,891,915 | A | * | 6/1975 | Yannone et al. ............... 322/15 |
| 3,971,208 | A | * | 7/1976 | Schwent ...................... 60/773 |
| 4,006,590 | A | * | 2/1977 | Itoh ....................... 60/39.281 |
| 4,054,780 | A | * | 10/1977 | Bartley et al. ................ 700/30 |
| 4,058,975 | A | * | 11/1977 | Gilbert et al. ............ 60/39.281 |
| 4,077,204 | A | * | 3/1978 | Itoh ....................... 60/39.281 |
| 4,249,238 | A | * | 2/1981 | Spang et al. ................ 701/100 |
| 4,764,025 | A | * | 8/1988 | Jensen ....................... 374/144 |
| 5,335,500 | A | * | 8/1994 | Wunderlich et al. .......... 60/609 |
| 5,361,576 | A | * | 11/1994 | Muller ....................... 60/773 |
| 5,394,689 | A | * | 3/1995 | D'Onofrio .................... 60/204 |
| 5,755,510 | A | * | 5/1998 | Hernandez et al. .......... 374/121 |

(Continued)

FOREIGN PATENT DOCUMENTS

JP 63150435 (A) 6/1988

(Continued)

*Primary Examiner*—Khoi Tran
*Assistant Examiner*—Jorge O Peche
(74) *Attorney, Agent, or Firm*—Squire, Sanders & Dempsey L.L.P.

(57) ABSTRACT

In a system for monitoring an output of a sensor for detecting an operating state of a gas turbine engine by comparing a value of an output of the sensor with a prescribed reference value, a calibration map for converting the output of the sensor into a variable that is normally used for controlling the engine is used for defining the reference value for determining the state of the sensor. Thereby, a fault of a sensor can be detected both accurately and promptly by using the existing resource without unduly complicating the control program. It is particularly desirable to monitor the output of the sensor by taking into account the current operating condition of the engine to improve the reliability in detecting a fault in the sensor.

4 Claims, 6 Drawing Sheets

U.S. PATENT DOCUMENTS

| | | | |
|---|---|---|---|
| 5,775,089 A * | 7/1998 | Skarvan | 60/773 |
| 5,839,420 A * | 11/1998 | Thomas | 123/478 |
| 5,878,566 A * | 3/1999 | Endo et al. | 60/773 |
| 6,393,355 B1 * | 5/2002 | Muramatsu | 701/100 |
| 6,408,259 B1 * | 6/2002 | Goebel et al. | 702/183 |
| 6,438,484 B1 * | 8/2002 | Andrew et al. | 701/100 |
| 6,493,689 B2 * | 12/2002 | Kotoulas et al. | 706/23 |
| 6,557,530 B1 * | 5/2003 | Benson et al. | 123/480 |
| 6,711,891 B2 * | 3/2004 | Kitamura et al. | 60/276 |
| 6,741,919 B1 * | 5/2004 | Schuster et al. | 701/34 |
| 7,003,939 B1 * | 2/2006 | Rackwitz et al. | 60/786 |
| 7,266,942 B2 * | 9/2007 | Iihoshi et al. | 60/277 |
| 2003/0024514 A1 * | 2/2003 | Kitamura et al. | 123/672 |
| 2003/0089100 A1 * | 5/2003 | Ueno et al. | 60/277 |
| 2005/0262828 A1 * | 12/2005 | Iihoshi et al. | 60/277 |

FOREIGN PATENT DOCUMENTS

| | | |
|---|---|---|
| JP | 6-264767 | 9/1994 |
| JP | 2000-249629 | 9/2000 |

* cited by examiner

SYSTEM FOR MONITORING SENSOR OUTPUTS OF A GAS TURBINE ENGINE

TECHNICAL FIELD

The present invention relates to a system for monitoring the outputs of sensors that detect various state variables of a gas turbine engine for the purpose of detecting any abnormal condition in any one of the sensors.

BACKGROUND OF THE INVENTION

In an aircraft gas turbine engine, a large number of sensors are provided in various parts thereof and the output values of these sensors are used for optimally controlling the operation of the engine. A fault in any one of such sensors may cause abnormal values in the control parameters, and prevents satisfactory operation of the engine. Therefore, it is highly important to take appropriate measures in case of a sensor failure.

A fault of a sensor can be detected in come cases by comparing the output value of the sensor with a certain limit value or the change rate of the output value of the sensor with a prescribed threshold value. See Japanese patent laid-open publication No. 6-264767, for instance.

However, this known technology is only suitable for detecting misfire when starting the engine, and is not suitable for promptly detecting a fault in a sensor during the normal steady-state and transient operation of the engine. Also, to permit detection of an abnormal output of each one of a large number of sensors, a same number of reference maps as the number of the sensors are required for evaluating every one of the sensors. This undesirably increases the complexity of the control program.

In the case of a gas turbine engine including a high pressure shaft and a low pressure shaft that are disposed in a coaxial relationship, it is also known to define a prescribed relationship between the rotational speeds of the high pressure shaft and low pressure shaft, and judge that at least one of the sensors is faulty when the output values of the rotational speed sensors for the high pressure shaft and low pressure shaft deviate from the prescribed relationship beyond a certain threshold. See Japanese patent laid open publication No. 2000-249629.

Again, this known technology is capable of achieving any reliability only in a limited operating range, and is unable to detect a fault in the sensors in the high speed and/or transient operating mode of the engine.

BRIEF SUMMARY OF THE INVENTION

In view of such problems of the prior art, a primary object of the present invention is to provide a system for monitoring the outputs of sensors that detect various state variables of a gas turbine engine which allows a fault of the sensors to be detected both accurately and promptly by taking into account the current operating condition of the engine.

A second object of the present invention is to provide a system for monitoring the outputs of sensors for detecting various state variables of a gas turbine engine which allows a fault of the sensors to be detected both accurately and promptly without unduly complicating the control program.

A third object of the present invention is to provide a system for monitoring the outputs of sensors for detecting various state variables of a gas turbine engine including a high pressure shaft and a low pressure shaft that are disposed in a coaxial relationship which allows a fault in one of the high pressure shaft rotational speed sensor and the low pressure shaft rotational speed sensor to be detected by comparing the reading of one of the sensors with a value that is estimated from the reading of the other in a reliable manner.

According to the present invention, at least part of the aforementioned objects can be accomplished by providing a system for monitoring an output of a sensor for detecting an operating state of a gas turbine engine by comparing a value of an output of the sensor with a prescribed reference value, comprising: a calibration map for converting the output of the sensor into a variable that can be used for controlling the engine, the prescribed reference value being defined in the calibration map.

Because the reference values are defined in association with the calibration map which is used for the control of the engine, the complexity of the system can be minimized through the use of the existing resource. In particular, if the system further comprises means for detecting a current operating mode of the engine, and the prescribed reference value is varied depending on the current operating mode, the monitoring of the sensor can be executed in a highly precise and efficient manner so that an unexpected behavior of the engine can be ensured and the reliability of the engine can be enhanced. According to a preferred embodiment of the present invention, the current operating mode of the engine may be detected by comparing the output value of the sensor with an operating mode detecting value defined on the calibration map.

According to another aspect of the present invention, there is provided a system for monitoring an output of a sensor for detecting an operating state of a gas turbine engine including a high pressure shaft and a low pressure shaft disposed in a coaxial relationship by comparing a value of the output of the sensor with a prescribed reference value, comprising: a low pressure shaft rotational speed sensor for detecting a rotational speed of the low pressure shaft; a high pressure shaft rotational speed sensor for detecting a rotational speed of the high pressure shaft; an inlet air temperature sensor for detecting a temperature of air at an inlet end of the engine; estimating means for estimating a rotational speed of the low pressure shaft according to an output of the high pressure shaft rotational sensor and an output of the inlet air temperature sensor; comparing means for comparing an estimated value of the rotational speed of the low pressure shaft estimated by the estimating means and an output of the low pressure shaft rotational speed sensor; and determining means for detecting a fault in the low pressure shaft rotational speed sensor according to a result of comparison by the comparing means.

Thereby, should the low pressure shaft rotational speed sensor fail, it would be possible to detect it promptly by comparing the output of the low pressure shaft rotational speed sensor with an estimated value of the low pressure shaft rotational speed based on the output of the high pressure shaft rotational speed sensor and output of the inlet air temperature sensor so that the reliability of the engine control can be enhanced. In particular, if the comparing means compares the estimated value of the rotational speed of the low pressure shaft estimated by the estimating means and the output of the low pressure shaft rotational speed sensor only when the estimated value is greater than a prescribed value, it becomes possible to simplify the sensor fault detecting process, and this is particularly beneficial where there are two or more low pressure shaft rotational speed sensors.

The foregoing feature can also be implemented by exchanging the low pressure shaft rotational speed sensor and high pressure shaft rotational speed sensor with each other, and using an appropriate map for estimating the output of the low pressure shaft rotational speed sensor or the high pressure shaft rotational speed sensor as the case may be.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
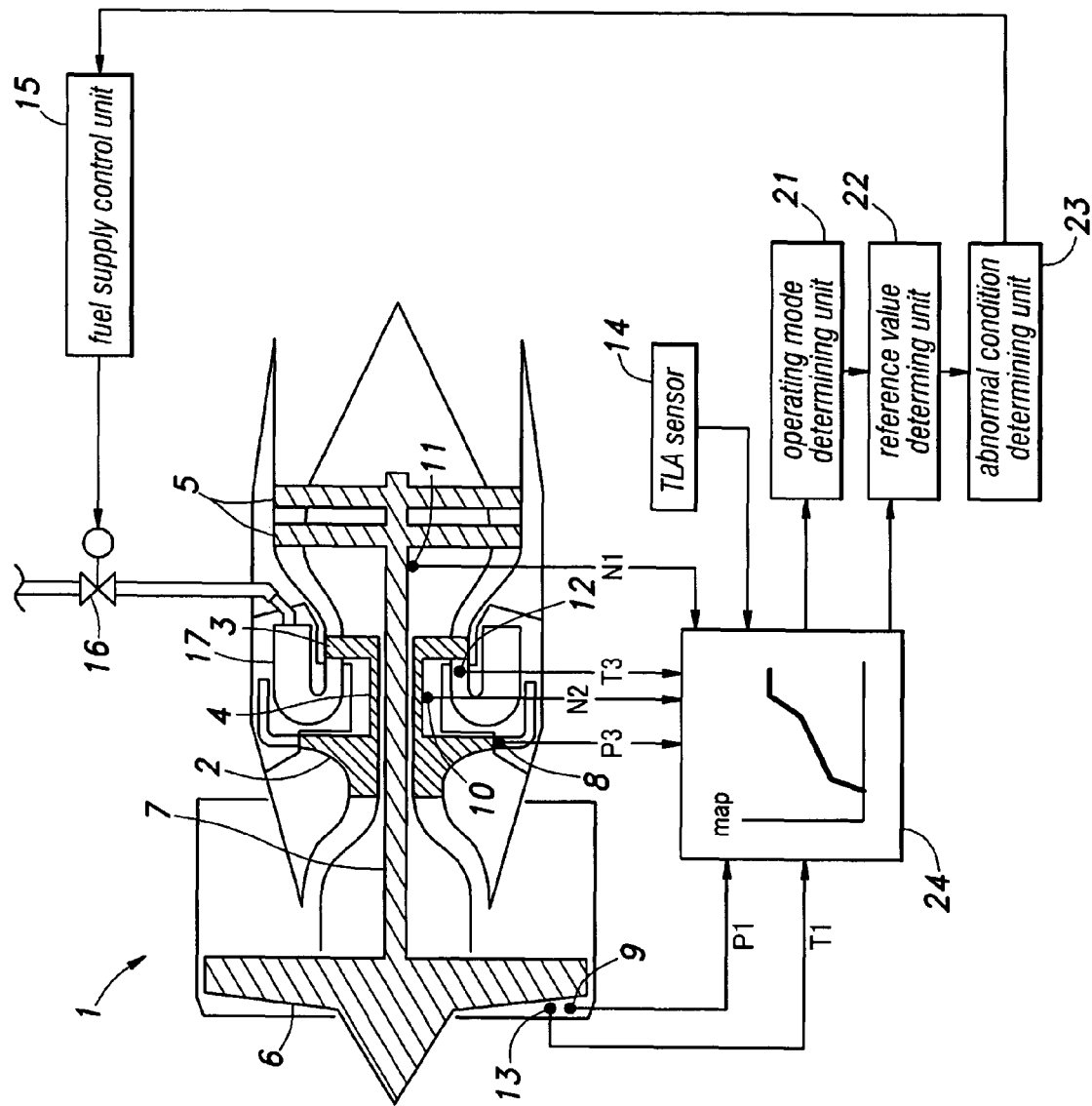
FIG. 1 is a diagram of a gas turbine engine including a system embodying the present invention.

FIG. 1 schematically illustrates a gas turbine engine to which the present invention is applied. This gas turbine engine 1 comprises a high pressure shaft 4 carrying a compressor rotor 2 and a high pressure turbine wheel 3, and a low pressure shaft 7 carrying a low pressure turbine wheel 5 and a fan 6. A combustion unit 17 is provided immediately upstream of the high pressure turbine. The instrumentation of this engine comprises a high pressure sensor 8 for measuring the outlet pressure P3 of the compressor, a low pressure sensor 9 for measuring the inlet pressure of the fan 6, a high pressure shaft rotational speed sensor 10 for measuring the rotational speed N2 of the high pressure shaft 4, a low pressure shaft rotational speed sensor 11 for measuring the rotational speed N1 of the low pressure shaft 7, a high temperature sensor 12 for measuring the inlet temperature of the high pressure turbine, an inlet air temperature sensor 13 for measuring the temperature of air at the inlet end of the engine and a throttle lever angle sensor 14 for detecting the angular position of a throttle lever. A fuel supply control unit 15 controls a fuel metering valve 16 that supplies fuel to the combustion unit 17 according to the outputs from these sensors so that the engine may operate under an optimum condition at all times.

These sensors 8 to 14 are monitored by a sensor monitoring system so as to detect an abnormal output from any one of the sensors and take appropriate measures if such an abnormal output is detected. In the illustrated embodiment, the monitoring of the sensors takes into account the current operating mode of the engine. For this purpose, the sensor monitoring system comprises an operating mode determining unit 21, a reference value determining unit 22 and a sensor abnormal condition determining unit 23. The sensor monitoring system also makes use of calibration maps 24 that are provided for the purpose of converting the outputs of various sensors into calibrated values suitable for use as inputs for controlling the engine.

Figure 2:
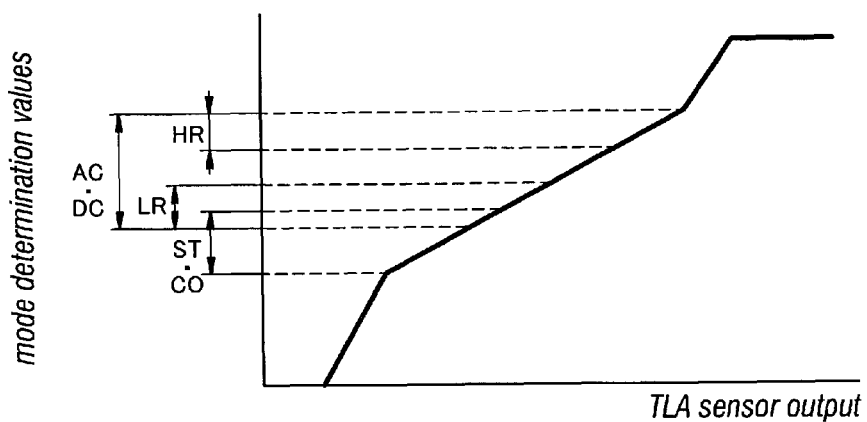
FIG. 2 is a graph showing the mode determination values on a calibration map for the output of a throttle lever angle sensor.
Figure 3:
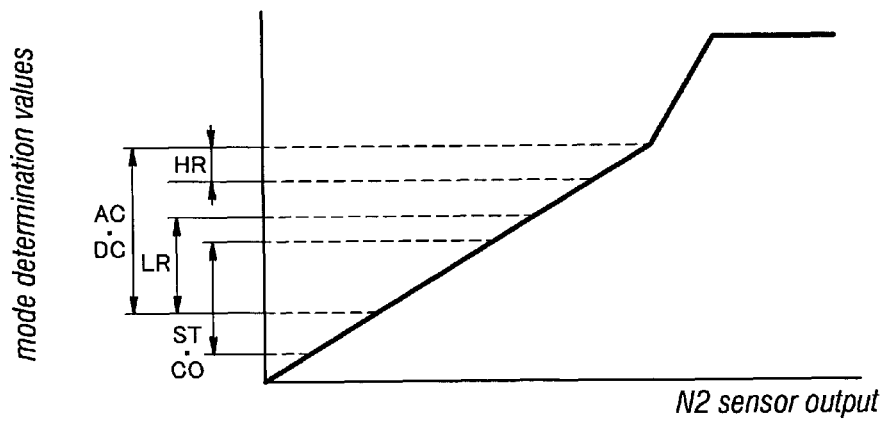
FIG. 3 is a graph showing the mode determination values on a calibration map for the output of a high pressure shaft rotational speed sensor.

The operating mode determining unit 21 is adapted to identify the current operating mode of the engine by comparing the outputs of the sensors such as the throttle lever angle sensor 14 and high pressure shaft rotational speed sensor 10 with the corresponding mode determination values that are defined on the corresponding calibration maps 24 (FIGS. 2 and 3).

The operating modes of the engine include start ST, low load steady-state LR, acceleration AC, high load steady-state HR, deceleration DC and emergency fuel cut CO modes. Only the maps for the output values of the throttle lever angle sensor 14 and the high pressure shaft rotational speed sensor 10 are mentioned in the illustrated embodiment in connection with the determination of the current operating mode, but the accuracy of mode determination can be improved by alternatively and/or additionally taking into account the output values of a speed meter and an altitude meter and a predetermined flight schedule as well as the outputs of the other sensors.

Figure 4:
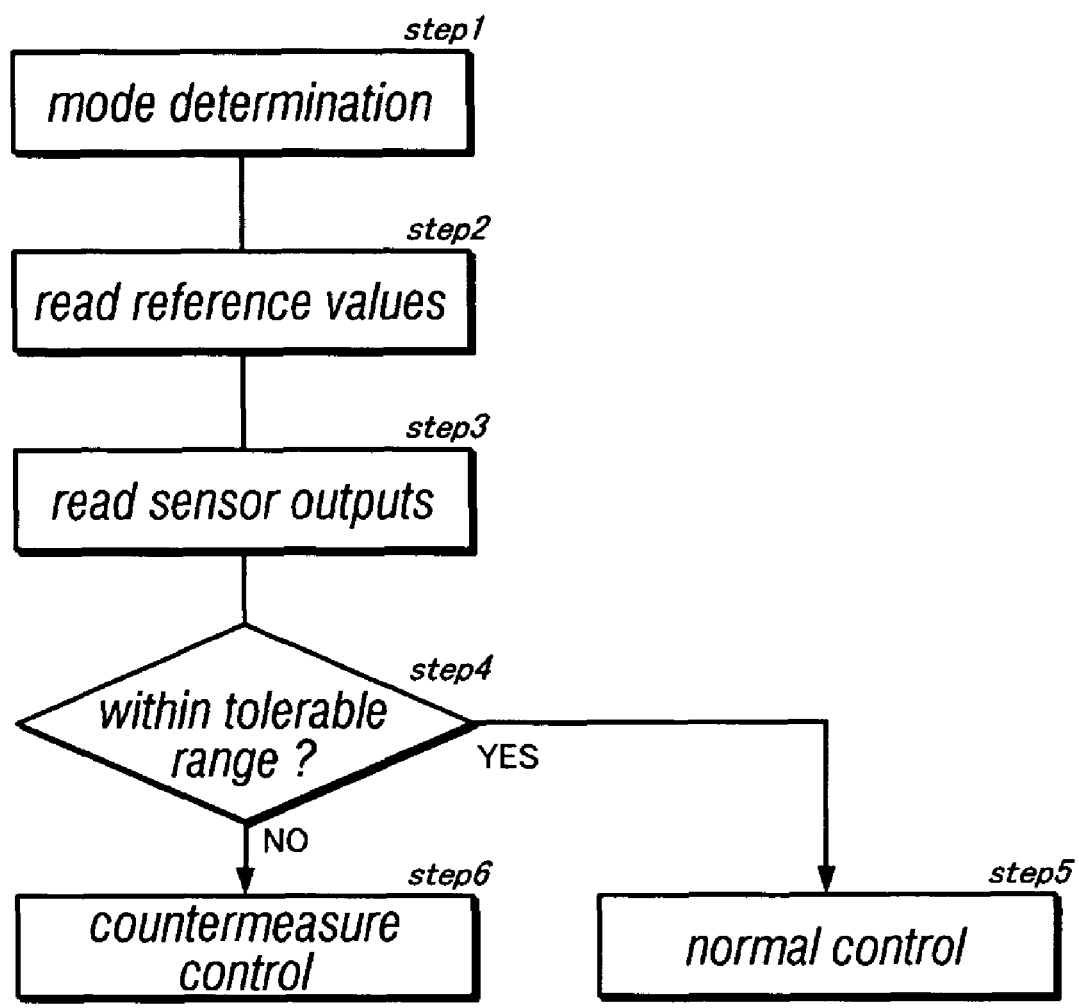
FIG. 4 is a flowchart of the process of monitoring sensor outputs according to the present invention.

The control flow of the process for determining an abnormal condition of the sensor outputs is now described in the following with reference to FIG. 4.

First of all, the operating mode determining unit 21 determines the current operating mode from the start ST, low load steady-state LR, acceleration AC, high load steady-state DC, deceleration DC and emergency fuel cut CO modes (step 1). Because the operating mode is necessarily the start mode at the beginning of the control flow, the reference values corresponding to the start mode are read out at the beginning of the control flow (step 2). The output values of the various sensors are read when the start switch is pressed (step 3), and are compared with the corresponding reference values to determine if they fall within prescribed tolerable ranges.

If the output values of the sensors are determined to be all within the prescribed tolerable ranges in step 4, as it means that the sensors are all in proper order, the normal start control is continued according to the outputs of the sensors (step 5). If any one of the output values is determined to be outside the corresponding prescribed tolerable range, an alarm is issued to indicate a fault in the sensor, and a countermeasure control mode corresponding to the failure of the sensor is selected for the operation of the engine (step 6). Such countermeasure control modes include (1) the use of a secondary sensor or a secondary CPU, (2) the use of an estimated value based on the outputs from other sensors instead of the output value of the faulty sensor, and (3) the use of a prescribed fixed value instead of the output value of the faulty sensor.

Once the engine has started, the operating mode of the engine changes from one mode to another as the time progresses. The operating mode determining unit 21 takes into account the output values of the throttle lever angle sensor 14 and the high pressure shaft rotational speed sensor 10 when determining the current operating mode of the engine. More specifically, the operating mode determining unit 21 marks the corresponding reference values on the calibrated values of the calibration maps (FIGS. 2 and 3) for these sensors 10 and 14, and looks up these maps to determine the current mode by comparing the calibrated values with the reference values. The operating mode determining unit 21 additionally takes into account the output values of a speed meter and an altitude meter and a predetermined flight schedule among other variables to exactly determine the current operating mode.

Once the operating mode is determined, the reference value determining unit 22 marks the corresponding tolerable range of each sensor on the corresponding calibration map, and determines if the output of each particular sensor is within the prescribed tolerable range.

Figure 5:
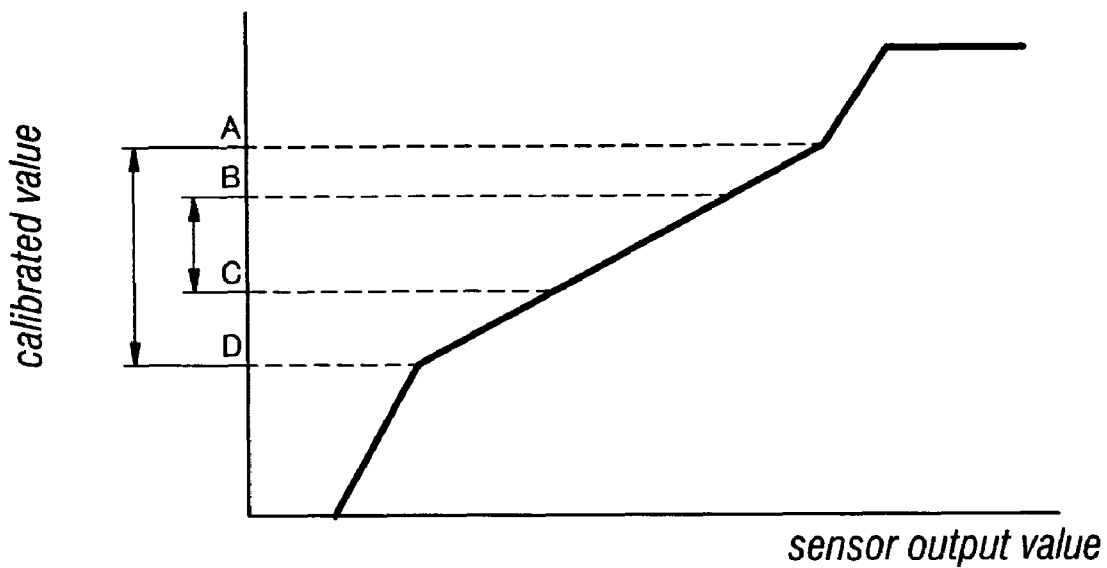
FIG. 5 is a graph showing the tolerable range of the calibrated value on a calibration map for the output of a certain sensor.

In the case of the inlet pressure P1 of the fan, outlet pressure P3 of the compressor 2 and inlet temperature T3 of the turbine, the calibration map for applying the reference values is given as represented in FIG. 5. In other words, in these cases, the calibration curve includes a central linear region having a certain inclination and regions of a greater inclination that are connected to either end the central region. The regions of the greater inclination allow detection of abnormal output values of the corresponding sensor at a higher sensitivity because the calibration value changes more rapidly or more pronouncedly than the output value of the sensor. The calibration curve includes a saturated region in the upper (larger) end of the curve to prevent an output value of an excessive level from being transmitted from the sensor to the control system.

Figure 6:
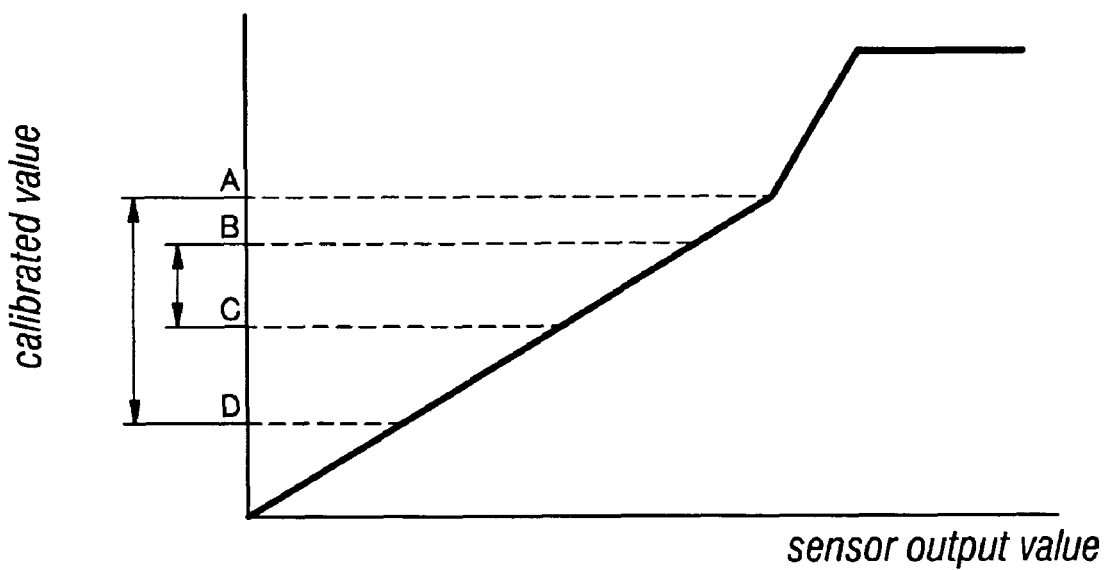
FIG. 6 is a graph showing the tolerable range of the calibrated value on a calibration map for the output of another sensor.

In the case of the rotational speed N1 of the low pressure shaft 7 and rotational speed N2 of the high pressure shaft 4, the calibration map for applying the reference values is given as represented in FIG. 6. In other words, in these cases, the calibration curve includes a main linear region having a certain inclination extending from a low value region and a region of a greater inclination that is connected to the high value end the main region. The region of the greater inclination allows detection of abnormal output values of the corresponding sensors because the calibration value changes more rapidly and more pronouncedly than the output value of the sensor. The saturation region connected to the high value end of the region of the greater inclination similarly prevents an output value of an excessive level from being transmitted from the sensor to the control system.

These calibration maps convert the output value of each sensor (abscissa) to a corresponding calibrated value (ordinate), and are used for converting the output values of the various sensors to values that are suitable for use as control parameters of the engine. In the illustrated embodiment, the reference values and prescribed tolerance regions are defined on the ordinate of each calibration map.

Because the output of each sensor may contain noises, a single sampling of an output value may not represent the output value. It is therefore preferable to compare two or more sample values and evaluate the fluctuations in the sampled value. The magnitude of the fluctuations may be taken into account so that the evaluation of the status of each sensor may be performed in an optimum fashion.

Figure 7:
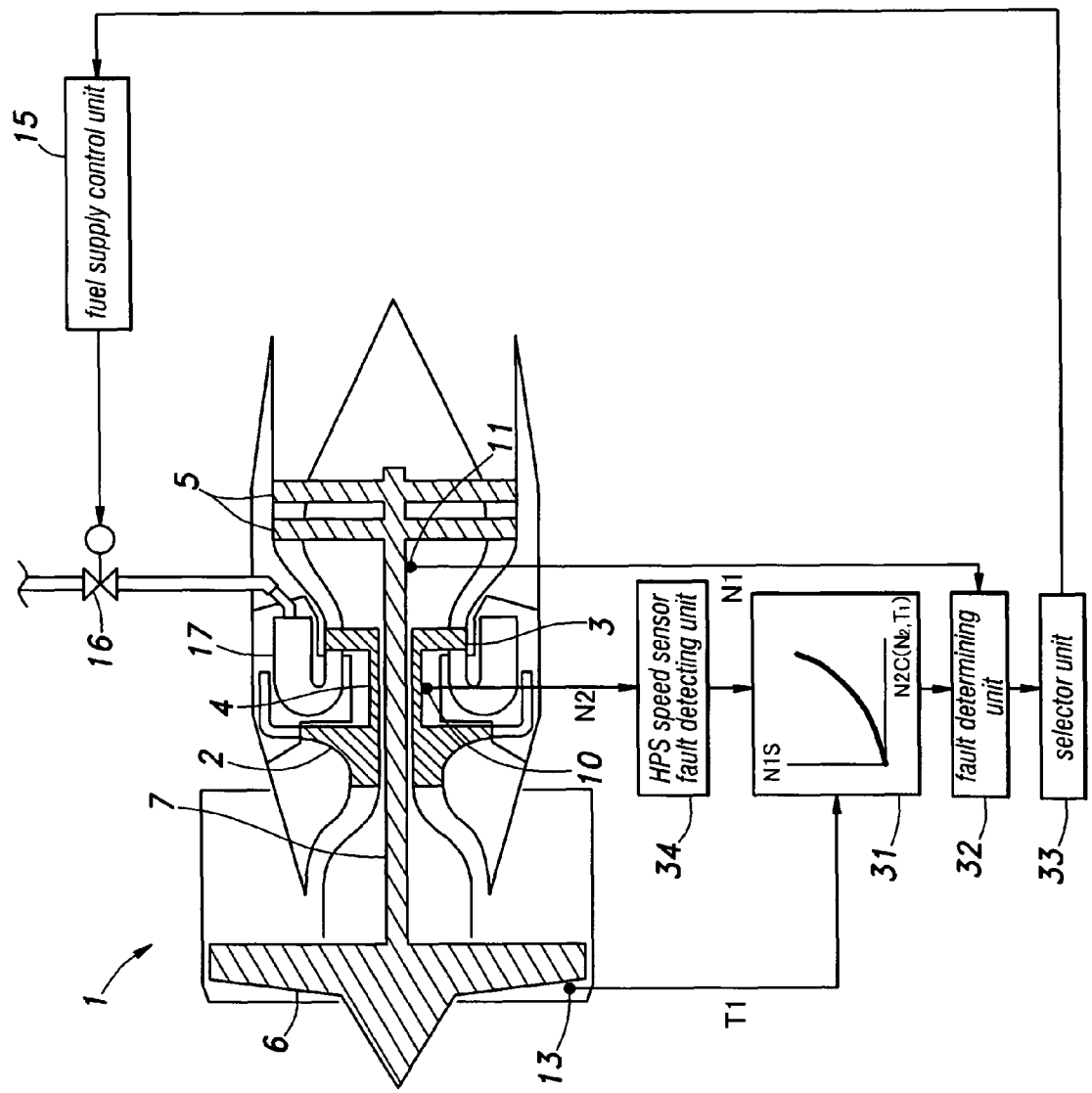
FIG. 7 is a diagram of a gas turbine engine incorporated with a second embodiment of the present invention.

FIG. 7 shows a gas turbine engine that is incorporated with a second embodiment of the present invention. The parts corresponding to those of the previous embodiment are denoted with like numerals without repeating the description of such parts.

This embodiment further comprises an estimating unit 31 for estimating the rotational speed of the low pressure shaft 7 from the outputs of the high pressure shaft rotational speed sensor 10 and inlet air temperature sensor 13, a determining unit 32 for determining if the low pressure shaft rotational speed sensor 11 is operating properly and a selector unit 33 for selecting between the output from the low pressure shaft rotational speed sensor 11 and the output from the estimating unit 31.

More specifically, the estimating unit 31 generates a reference value N1S which is to be compared with the output N1 from the low pressure shaft rotational speed sensor 11 to determine if there is any fault in the low pressure shaft rotational speed sensor 11. This reference value N1S is obtained by modifying the rotational speed N2 of the high pressure shaft 4 detected by the high pressure shaft rotational speed sensor 10 with the inlet air temperature T1 at the inlet of the engine, or more specifically at the inlet of the fan 6 measured by the inlet air temperature sensor 13, and feeding this modified rotational speed N2C of the high pressure shaft 4 to a calibration map incorporated in the estimating unit 31. The calibration map may consist of one provided for the purpose of converting the output of a sensor into a calibrated values suitable for use as an input for controlling the engine.

Preferably, the estimating unit 31 may be incorporated with a plurality of such maps for different operating modes such as stead-state, accelerating and decelerating modes so that one of such maps may be selected for use depending on the current operating mode of the engine. In the illustrated embodiment, the modified rotational speed N2C of the high pressure shaft is given by the following formula:

$$N2C(N2,T1)=N2/\{(T1+273.15)/288.15\}^{1/2} \qquad (1)$$

Figure 8:
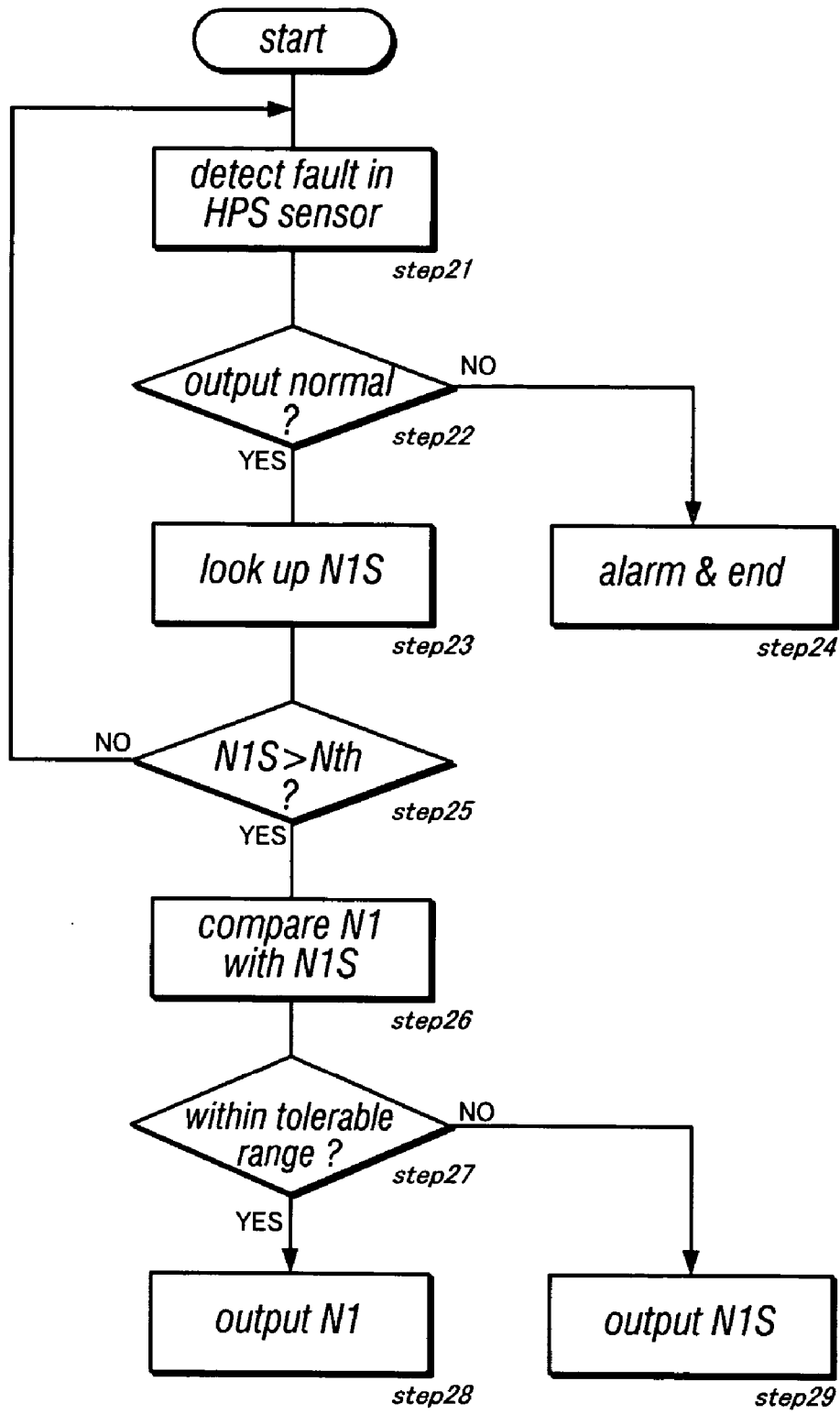
FIG. 8 is a flowchart of the control process of the second embodiment of the present invention.

FIG. 8 shows the control process for detecting a fault in the low pressure shaft rotational speed sensor 11.

First of all, the output value N2 of the high pressure shaft rotational sensor 10 is forwarded to a fault detecting unit 34 for the high pressure shaft rotational speed sensor 10 (step 21) and is determined if it is normal or not (step 22). This can be effected by sampling the output value of the high pressure shaft rotational sensor 10 at every 10 msec and comparing each sampled value with a prescribed threshold value. If any of the sampled value exceeds this threshold value, it is determined that the high pressure shaft rotational sensor 10 is faulty.

If no fault is found with the high pressure shaft rotational sensor 10, the output value N2 of the high pressure shaft rotational sensor 10 is forwarded to the estimating unit 31, and is used for looking up the reference value N1S from the map (step 23). If the high pressure shaft rotational sensor 10 was found to be faulty in step 22, an alarm is issued to indicate this and the control action is terminated in step 24.

Following step 23, it is determined if the reference value N1S is compared with a certain prescribed threshold value Nth (the idling rotational speed of 3,000 rpm, for instance) in step 25. If the reference value N1S is less than the prescribed threshold value Nth, the program flow returns to step 21. If the reference value N1S is greater than the prescribed threshold value Nth, the output N1 of the low pressure shaft rotational sensor 11 is compared with reference value N1S in step 26. The difference between the output N1 of the low pressure shaft rotational sensor 11 and reference value N1S is compared with a prescribed tolerance value in step 27. If this difference is within the prescribed tolerance value, the low pressure shaft rotational sensor 11 is determined as being normal, and the selection unit 33 selects the output of the low pressure shaft rotational sensor 11 for use in the control of the engine (step 28). Conversely, it this difference is beyond the prescribed tolerance value, the selection unit 33 selects the output N1S of the estimating unit 31 for use in the control of the engine (step 29).

Thus, according to the present invention, even when there is a fault in the low pressure shaft rotational speed sensor 11 for detecting the rotational speed of the low pressure shaft 7, by generating a substitute output N1S for the sensor which allows the engine to be operated in a stable manner and in a manner that suits the current operating mode, any sudden change in the behavior of the engine can be avoided.

In particular, if the comparing means compares the estimated value N1S of the rotational speed of the low pressure shaft estimated by the estimating means with the output N1 of the low pressure shaft rotational speed sensor 11 only when the estimated value N1S is greater than a prescribed value Nth as given in steps 25 and 26, it is possible to detect a fault even when both the sensors have become faulty without any difficulty even in a low speed range.

The foregoing embodiment used only one low pressure shaft rotational speed sensor 11, but it is also possible to use two low pressure shaft rotational speed sensors 11 and compare the output values of the two sensors for the purpose of improving the reliability. In a low speed range, because the absolute values of the two low pressure shaft rotational speed sensors are small, the difference between them in case of a failure in one of the sensors will be correspondingly small, and it is therefore relatively difficult to detect a fault in a low speed range. However, when the foregoing embodiment is applied to a case where two ore more low pressure shaft rotational speed sensors 11 are used, it is possible to detect a fault in one of the sensors both accurately and promptly without unduly complication the arrangement even in a low speed range.

Although the present invention has been described in terms of preferred embodiments thereof, it is obvious to a person skilled in the art that various alterations and modifications are possible without departing from the scope of the present invention which is set forth in the appended claims. For instance, the low pressure shaft rotational speed sensor and high pressure shaft rotational speed sensor may be interchanged with each other in the foregoing embodiment. In such a case, an appropriate map for estimating the output of the high pressure shaft rotational speed sensor will be used.

The contents of the original Japanese patent applications on which the Paris Convention priority claim is made for the present application are incorporated in this application by reference.

The invention claimed is:

1. A system for monitoring an output of a sensor for detecting an operating state of a gas turbine engine by comparing a value of an output of the sensor with a prescribed reference value, comprising:
   a plurality of calibration maps, each calibration map corresponding to one of a plurality of sensors, and configured to convert the output of the sensor into a variable that can be used to control the engine, the prescribed reference value being defined in the calibration map;
   a mode detecting unit configured to detect a current operating mode of the engine, and configured to determine the current operating mode from a start, a low load steady-state, an acceleration, a high load steady-state, a deceleration, and emergency fuel cut modes,
   wherein a countermeasure control mode corresponding to a failure of the sensor is selected for the operation of the engine when the output is determined to be outside a tolerable range; and
   a reference value determining unit configured to mark the tolerable range of each sensor on the corresponding calibration map and determine whether the output of each sensor is within the tolerable range.

2. The system for monitoring an output of a sensor according to claim 1, wherein the calibration maps includes a calibration map which is shared by a plurality of sensors.

3. The system for monitoring an output of a sensor according to claim 1, wherein each calibration map is represented by a two dimensional curve that includes a plurality of sections having different inclinations.

4. The system for monitoring an output of a sensor according to claim 1, wherein the system is configured to detect the current operating mode of the engine by comparing the output value of the sensor with an operating mode detecting value defined on the calibration map.

* * * * *